United States Patent [19]
Kragl

[11] Patent Number: 5,666,446
[45] Date of Patent: Sep. 9, 1997

[54] METHOD FOR PRODUCING A COVER FOR AN INTEGRATED OPTICAL CIRCUIT AND COVER FOR AN INTEGRATED OPTICAL CIRCUIT

[75] Inventor: Hans Kragl, Ober-Ramstadt, Germany

[73] Assignee: Robert Bosch GmbH, Stuttgart, Germany

[21] Appl. No.: 284,509

[22] PCT Filed: Dec. 4, 1993

[86] PCT No.: PCT/DE93/01157

§ 371 Date: Aug. 8, 1994

§ 102(e) Date: Aug. 8, 1994

[87] PCT Pub. No.: WO94/14093

PCT Pub. Date: Jun. 23, 1994

[30] Foreign Application Priority Data

Dec. 7, 1992 [DE] Germany ............... 42 40 950.0

[51] Int. Cl.$^6$ ................................................. G02B 6/12
[52] U.S. Cl. ................................................. 385/14
[58] Field of Search ............... 385/2, 5, 9, 14, 385/43, 46, 49, 129, 131, 132, 143; 250/227.24; 257/82, 724; 264/1.1, 1.24, 1.25

[56] References Cited

U.S. PATENT DOCUMENTS

| 4,079,404 | 3/1978 | Comerford et al. | 357/19 |
| 4,611,886 | 9/1986 | Cline et al. | 385/76 |
| 4,917,451 | 4/1990 | Chouinard et al. | 385/2 |
| 4,930,854 | 6/1990 | Albares et al. | 385/49 |
| 4,955,718 | 9/1990 | Michel | 385/14 X |
| 5,131,735 | 7/1992 | Berkey et al. | 385/43 |
| 5,159,700 | 10/1992 | Reid et al. | 385/14 |
| 5,282,071 | 1/1994 | Hartman et al. | 385/14 |
| 5,311,604 | 5/1994 | Rogner et al. | 385/14 |
| 5,454,055 | 9/1995 | Kragl et al. | 385/14 |

FOREIGN PATENT DOCUMENTS

| 0 495 559 | 7/1992 | European Pat. Off. |
| 42 12 208 | 10/1993 | Germany. |
| 59-121008 | 7/1984 | Japan. |
| 02 131 202 | 5/1990 | Japan. |

Primary Examiner—Akm E. Ullah
Attorney, Agent, or Firm—Kenyon & Enyon

[57] ABSTRACT

A method for producing a cover for an integrated optical circuit, and an integrated optical circuit produced with this cover. The method minimizes the effort for the integration of optical components into fiber-optic systems by automatically positioning an optical component placed onto a mold punch. A liquid that can harden is poured around the optical component and the mold punch, and after this solidifies, it forms the cover.

4 Claims, 2 Drawing Sheets

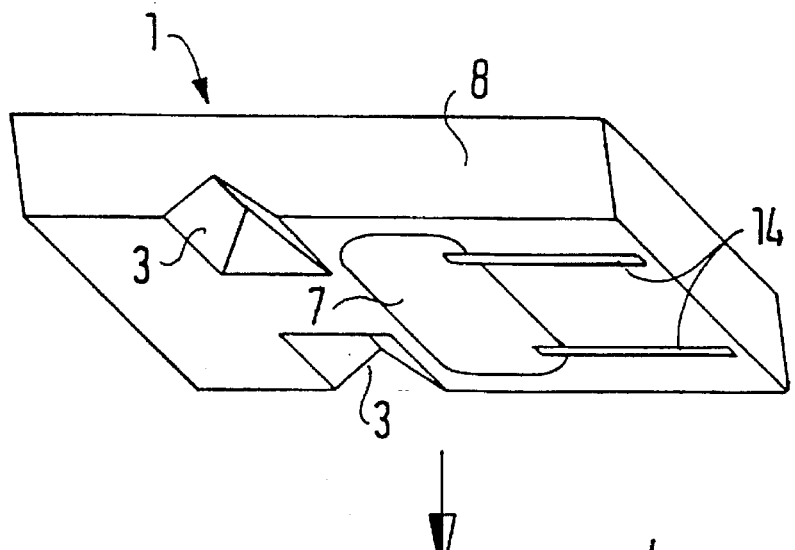
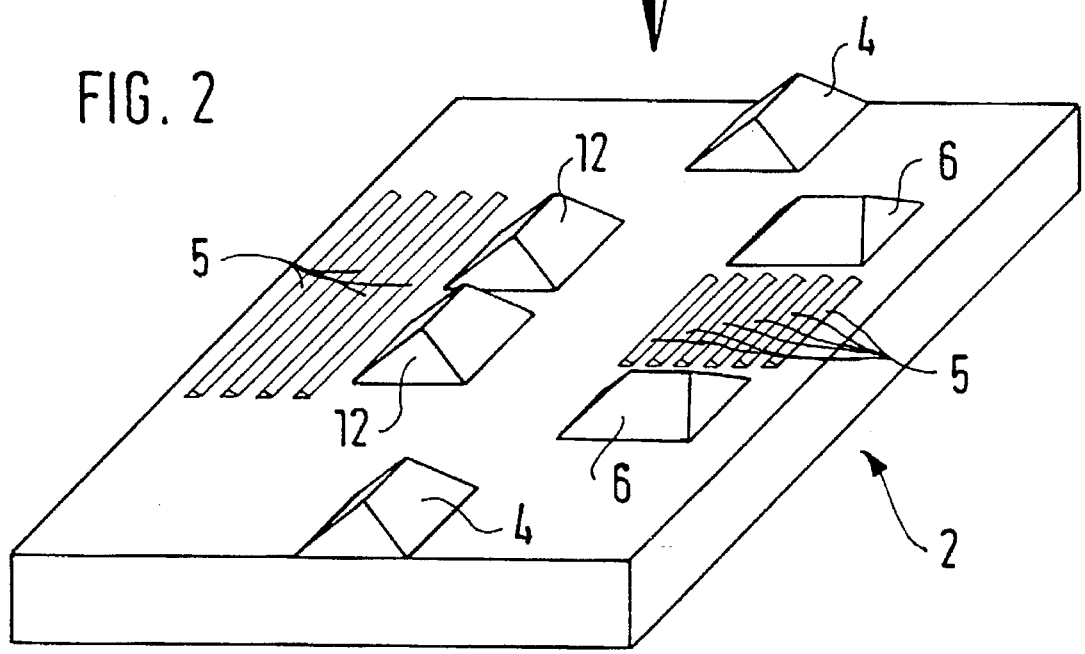

METHOD FOR PRODUCING A COVER FOR AN INTEGRATED OPTICAL CIRCUIT AND COVER FOR AN INTEGRATED OPTICAL CIRCUIT

STATE OF THE ART

The invention proceeds from a method for the production of a cover for an integrated optical circuit pursuant to the preamble of the main claim.

From patent application DE-P 42 12 208.2, a method for the production of optical polymer components with an integrated fiber chip coupling using casting technology is already known. Here, a polymer substrate is formed by means of a master structure, in order to couple an integrated optical circuit between two glass fibers, in such a way that the glass fibers come to rest in the substrate in a V-shaped groove. In this connection, their longitudinal axis is flush with the longitudinal axis of a lightwave guide channel arranged between the V-shaped grooves. By filling the grooves and the lightwave guide channel with polymer adhesive, when a polymer cover is placed on top, a mechanically strong bond between the substrate and the cover, as well as optical coupling of the glass fibers to the lightwave guide formed of polymer adhesive, is guaranteed.

Furthermore, from the article "Channel glass wave guide detectors with grafted GaAs film in embedded configuration" in Electronic Letters 27 (1991), pages 410 to 412 by Chan, Yi-Yan, et al., it is known to couple a photodetector grafted onto a glass substrate to a lightwave guide located in the substrate, in evanescent manner. This production method requires precise positioning of the wave guide and of the photodetector relative to one another, which must be carried out individually for each component, and comprises a complicated positioning method.

ADVANTAGES OF THE INVENTION

The method according to the invention, with the characterizing features of the main claim, has the advantage, in contrast, that a cover for an integrated optical circuit is produced without positioning effort. Furthermore, there is the advantage that the method according to the invention is particularly suited for mass production, since the location of the optical component with regard to the mold punch is predetermined or results without further intervention. Furthermore, an advantage of the method consists of positioning an optical module with regard to fiber guide grooves for holding lightwave guides, although the optical component is smaller in dimensions than the distance between the guide projections provided for later holding light guides.

With the measures listed in the dependent claims, advantageous further developments and improvements of the method indicated in the main claim are possible.

The accuracy of positioning of the optical component in the mold punch is increased in that at least one positioning device is arranged on the mold punch, which positions the optical component on at least one side.

An advantageous arrangement consists of arranging two positioning devices on the mold punch, which delimit the optical component on opposite sides.

The positioning process when placing the optical component onto the mold punch is simplified in that the sides of the positioning device which face the optical component are beveled and the corresponding side surfaces of the optical component are at least partially beveled. In this way, the tolerance of the component dimensions which are permissible for automatic positioning of the optical component on the mold punch are increased and the positioning process is simplified.

The method is improved by using mold punches which have stress relief projections. The pressure applied to the optical component when the optical component is placed down is uniformly absorbed by the stress relief projections. This achieves the result that optical components made of brittle materials, particularly indium phosphide or gallium arsenide, are not damaged when they are placed on the mold punch. The production method is particularly suitable for bonding photodetectors to integrated optical lightwave guides, since here, particularly precise positioning is necessary, which be achieved in simple manner with the method according to the invention.

The cover according to the invention can be produced particularly easily according to one of the methods named, and is particularly suitable for use in an integrated optical circuit, where the lightwave guide is formed, in advantageous manner, by the adhesive which fills a groove in the substrate, when the cover is bonded to a substrate. The integrated optical circuit according to Claim 1 offers the advantage that the bonding of substrate and cover and the coupling of wave guides takes place in one step. Production can be carried out in cost-effective manner.

DRAWING

Embodiments of the invention are shown in the drawing and explained in greater detail in the following description. The drawing shows:

FIG. 1 the optical component,

FIG. 2 a mold punch 2, and

FIG. 3 a cover.

DESCRIPTION OF THE EMBODIMENTS

FIG. 1 shows the optical component 1, which in this select example consists of a photodetector which was made from indium phosphide. Two grooves 3 are made in the photodetector. The grooves 3 are arranged to align with each other and run parallel to the detector zone 7. At the detector zone 7, electrical incoming lines 14 are passed from the outside edge of the optical component 1. In this example, the grooves 3 are formed as V-shaped grooves. The grooves 3 are aligned with each other and each lead part of the way into the optical component 1 from the outside edges of the optical component 1.

In a particularly simple embodiment, the optical component 1 has only one recess 3, which is preferably formed as a groove. The location and the shape of the recess must be selected in accordance with the function of the recess and the structure of the optical component.

FIG. 2 shows a mold punch 2, which has guide projections 4, projections 12, positioning devices 6 and stress relief grooves 5. The guide projections 4 lead part of the way into the surface of the mold punch 2 from the outside edges of the mold punch 2. The guide projections 4 are preferably arranged at a right angle to the outside edges of the mold punch 2. The length of the guide projections 4 is determined by the fact that the guide grooves 11, which are preferably in V shape here, and are molded by the guide projections 4, are used to hold lightwave guides. The guide projections 4 are furthermore arranged in alignment. In this application example, the stress relief projections 5 run parallel to the alignment of the guide projections 4 and are arranged over the entire surface of the mold punch 2, except for the region between the guide projections 4. The stress relief projections 5 are preferably formed in V shape in this example. The size ratios of the stress relief projections 5 and the guide grooves 4 are not shown true to scale, since the height of the guide grooves 4 is on the order of 80 micrometers and the height of the stress relief projections 5 is in the range around 5 micrometers. The height and the width of the grooves 3 and the projections 12 are structured in shape so that they are adapted to each other and allow precise positioning of the optical component 1 with regard to the alignment of the guide projections 4, i.e. the optical component 1 is positioned precisely relative to the mold punch 2, both laterally and vertically.

Furthermore, two aligned projections 12 are arranged parallel to the alignment of the guide projections 4 between the region of the guide projections 4. The mold punch 2 furthermore has two positioning devices 6 which are arranged parallel to one another in a direction perpendicular to the alignment of the guide projections 4 and are laterally offset. Between the positioning devices 6, additional stress relief projections 5 are affixed parallel to the alignment of the guide projections 4 in this example. The projections 12 are of the same order of magnitude as the guide projections 4, i.e. approximately 80 micrometers high. The projections 12 and the positioning devices 6 are structured in V shape in this select example. The mold punch 2 preferably consists of a metal which is galvanically cast from a silicon mold. In this example, nickel was selected as the metal.

In a simple version, the mold punch 2 has only one projection 12, in addition to at least one guide projection 4. Correspondingly, the optical component 1 also has only one groove 3. The location of the projection 12 is adapted to the location of the groove 3. If several projections 12 are arranged, then their location can be selected to correspond to the location of the corresponding grooves 3.

In another, expanded embodiment, the mold punch 2 also has at least one positioning device 6 in addition to at least one guide projection 4 and at least one projection 12.

The location and the shape of the positioning device 6 must be selected in accordance with the function of the positioning device 6 and the shape of the optical component 1. The geometrical shape of the optical component 1 determines the shape of the positioning device 6.

FIG. 3 shows a cover 13 which was produced with the mold punch 2 shown in FIG. 2. The cover 13 has recesses 9. The recesses 9, which are offset laterally parallel to the alignment of the guide grooves 11 and are arranged between the guide grooves 11, were molded by the projections 12 of the mold punch 2.

The recesses 9, which are arranged parallel to the alignment of the guide grooves 11 and parallel to one another over the border region of the optical component 1, were molded by the positioning devices 6 of the mold punch 2. The location and orientation of the shaped optical component 1 has been outlined. The guide grooves 11, the recesses 9 and the depressions 10 are stamped in polymer in this select example.

The production of the cover 13 for an integrated optical circuit is explained using FIGS. 1 to 6.

A cover 13 for an integrated optical circuit with an optical component 1, which is automatically positioned on guide grooves 11 for lightwave guides in the production of the cover, is produced using a mold punch 2, as shown in FIG. 2. The optical component 1, as shown in FIG. 1, is smaller in dimensions than the distances between the guide projections 4 of the mold punch 2. In order to allow lateral and vertical positioning of the optical component 1 in spite of this, positioning devices 6 and projections 12 have been formed on the mold punch 2. The projections 12 are aligned and are arranged laterally offset to the alignment of the guide projections 4. The optical component 1 shown in FIG. 1 has grooves 3 which are arranged in alignment. The positioning devices 6 have beveled side surfaces at the sides which face the optical component 1 when the optical component 1 is laid down. In this select example, the positioning devices 6 are structured as V-shaped projections. Between the positioning devices 6, three stress relief projections 5 are arranged on the mold punch 2, parallel to the alignment of the guide projections 4. The mold punch 2 has additional stress relief projections 5 arranged parallel to the alignment of the guide projections 4 in the region of the mold punch 2 which is covered when the optical component 1 is placed onto the mold punch 2. In the alignment between the guide projections 4, no positioning devices 6 or stress relief projections 5 are arranged. When the optical component 1 is placed onto the mold punch 2, the projections 12 engage in the grooves 3. This determines the lateral position of the optical component 1 with reference to the alignment of the guide projections 4. At the same time, the vertical position is determined by the height difference of the projections 12 and the grooves 3. Furthermore, the optical component 1 is held along the lateral outside edges 8 of the optical component 1 by the positioning devices 6, and thus rotation or tilting of the optical component 1 when it is placed down is prevented. Since the optical component 1 is placed down under pressure, and many of the materials used for the production of optical components, such as indium phosphide, are very brittle, bending and damage of the optical component must be prevented. This achieved in that the optical component 1 rests on the stress relief projections 5 of the mold punch 2 with a large part of its entire surface. The optical component 1 now lies on the projections 12 and the stress relief projections 5 with the grooves 3. For better insertion of the optical component 1 between the positioning devices 6, the lateral outside edges of the optical component 1 are at least partially beveled. This allows the lateral outside edges 8 and the beveled side surfaces of the positioning devices 6 to slide against each other when they come into contact. This reduces the pressure required for positioning and increases the tolerances for the optical component 1 with regard to the distance of the positioning devices 6. With this method, the contact wires 14, which lead from the outside edge to the active zone 7 of the optical component 1, as shown in FIG. 1, are not completely covered by a polymer. This has the result that the electrical incoming lines 14 can be contacted without having to remove the polymer, i.e. the polymer can be removed without problems at the edge, in order to be able to produce the contact.

For the production of the cover 13, the component 1 is placed onto the mold punch 2. In order to ensure that the polymer gets into all the regions between the component 1 and the mold punch 2, the component 1 is wetted with liquid polymer before it is placed on the mold punch 2. Subsequently, a liquid which can harden, in this example a liquid polymer, is poured around the positioned optical component 1 and the mold punch 2. After the curing time of the liquid polymer, the mold punch 2 is removed and a cover 13, as shown in FIG. 3, is obtained. This cover 13 now has depressions 10, which were molded by the stress relief projections 5, recesses 9 which were formed by the projections 12 and the positioning devices 6, and guide grooves 11, which were formed by the guide projections 4. The active zone 7 of the optical component 1, as shown in FIG. 6, is positioned with reference to the alignment of the guide grooves 11. For the production of an integrated optical circuit, a substrate that has at least two, preferably V-shaped grooves is used. The distance, the size and the orientation of the V-shaped grooves correspond to that of the guide grooves 11 of the cover 13. An additional groove is arranged between the two V-shaped grooves. The integrated optical circuit is covered with a transparent adhesive, where the additional groove lying between the V-shaped grooves is filled and thus forms a lightwave guide. A light guide, particularly light fibers, is inserted in each of the two V-shaped grooves. The V-shaped grooves in which the light guides are inserted are also covered with the transparent adhesive. The cover 13 is placed onto the integrated optical circuit in such a way that the light guides are also held by the guide grooves 11. The cover 13 is pressed down so firmly that only a thin layer of transparent adhesive remains between the integrated optical circuit and the cover 13. When this is done, the recesses 9 and depressions 10 are also filled with the transparent adhesive. In this manner, an integrated optical circuit is produced, in which an optical component 1 located in a cover 13 is automatically positioned on the lightwave guide filled with adhesive and lying between the V-shaped grooves when the cover 13 is glued on, where the lightwave guide is formed by filling the additional groove with adhesive.

The production method described can also be applied analogously to mold punches 2 which have only at least one guide projection 4 and at least one projection 12 or at least one guide projection 4 and at least one projection 12 and one positioning device 6.

For simple positioning of the optical component 1, it is sufficient if the optical component 1 is positioned by at least one projection 12.

Precise positioning is achieved if the mold punch 2 has at least one positioning device 6 in addition to the projection 12, which positions the optical component at an outside edge.

I claim:

1. An assembly for an integrated optical circuit comprising:

a) an optical component having at least one groove extending to an outside edge of the optical component;

b) a cover having at least one recess extending the groove of the optical component away from the outside edge of the optical component and a guide groove to hold light guides; and c) an integrated optical circuit comprising a substrate that has at least two first grooves and an additional groove located between the at least two first grooves, wherein the cover of the optical component is attached to the substrate by an optically transparent adhesive, wherein the optically transparent adhesive also fills the additional groove lying between the at least two first grooves, and wherein the cover and the substrate are positioned laterally with respect to one another so that the guide grooves of the cover are arranged above the at least two first grooves of the substrate to form guide channels in which the light guides extending in the direction of the additional groove are received.

2. The assembly according to claim 1, wherein the cover has at least one additional recess adjacent to the outside edge of the optical component, the additional recess corresponding to a shape of a positioning device of a punch mold.

3. The assembly according to claim 1 wherein the cover has depressions corresponding to stress relief projections of a punch mold.

4. The assembly according to claim 1 wherein the optical component is a photodetector.

* * * * *

UNITED STATES PATENT AND TRADEMARK OFFICE
CERTIFICATE OF CORRECTION

Page 1 of 4

PATENT NO.   : 5,666,446
DATED         : September 9, 1997
INVENTOR(S)  : Hans Kragl It is certified that error appears in the above-identified patent and that said Letters Patent is hereby corrected as shown below:

Please delete columns 1-6 and substitute columns 1-6 as per attached.

Signed and Sealed this

Twenty-third Day of June, 1998

Attest:

BRUCE LEHMAN

*Attesting Officer*          *Commissioner of Patents and Trademarks*

METHOD FOR PRODUCING A COVER FOR AN INTEGRATED OPTICAL CIRCUIT AND COVER FOR AN INTEGRATED OPTICAL CIRCUIT

A method for producing a cover for an integrated optical circuit, and an integrated optical circuit produced with this cover. The method minimizes the effort for the integration of optical components into fiber-optic systems by automatically positioning an optical component placed onto a mold punch. A liquid that can harden is poured around the optical component and the mold punch, and after this solidifies, it forms the cover.

BACKGROUND OF THE INVENTION

The present invention is related to a method for producing a cover for an integrated optical circuit having a substrate in which a lightwave guide is integrated. The present invention is also related to the cover produced.

German Patent Application No. DE-P 42 12 208.2 describes a method for producing optical polymer components with an integrated fiber chip coupling using casting technology. A polymer substrate is formed by means of a master structure, to couple an integrated optical circuit between two glass fibers such that the glass fibers come to rest in the substrate in a V-shaped groove. The longitudinal axis of the two glass fibers is flush with the longitudinal axis of a lightwave guide channel arranged between the V-shaped grooves. By filling the grooves and the lightwave guide channel with polymer adhesive, when a polymer cover is placed on top, a mechanically strong bond between the substrate and the cover, as well as an optical coupling of the glass fibers to the lightwave guide formed of polymer adhesive, is assured.

Furthermore, the article Chan, Yi Yan, et al., "Channel glass wave guide detectors with grafted GaAs film in embedded configuration," *Electronic Letters*, Vol. 27, pp. 410–412 (1991) describes evanescently coupling a photodetector, grafted onto a glass substrate, to a lightwave guide located in the substrate. Unfortunately, this production method requires the wave guide to be precisely positioned relative to the photodetector. This precise positioning must be carried out for each individual component, and comprises a complicated positioning method.

Thus, there exists a need for a method for producing a cover for an integrated optical circuit that does not require complicated positioning operations.

SUMMARY OF THE INVENTION

The method of the present invention produces a cover for an integrated optical circuit without complicated positioning operations by providing a mold punch having at least one guide projection for holding a light guide and at least one additional projection. The at least one additional projection of the mold punch engages a groove of an optical component when the optical component is placed down onto the mold punch. The cover is produced by pouring a liquid, which hardens, around the optical component which has been placed on the mold punch. Furthermore, the method according to the present invention is particularly well suited for mass production since the location of the optical component relative to the mold punch is advantageously predetermined or results without further intervention. Furthermore, the method of the present invention advantageously positions an optical module relative to fiber guide grooves, used for holding lightwave guides, although the dimensions of the optical component are smaller than the distance between the guide projections provided for later holding the lightwave guides.

By arranging at least one positioning device on the mold punch, which positions the optical component on at least one side, the optical element can be more accurately positioned in the mold punch.

By arranging two positioning devices on the mold punch, the optical component is advantageously delimited on opposite sides.

By beveling the sides of the positioning device(s) which face the optical component and by at least partially beveling corresponding side surface(s) of the optical component, positioning the optical component in the mold punch is simplified. In this way, permissible tolerances of the component dimensions for automatically positioning the optical component on the mold punch are increased and the positioning process is simplified.

The method of the present invention preferably uses mold punches which have stress relief projections. The pressure applied to the optical component when the optical component is placed down is uniformly absorbed by the stress relief projections. Thus, optical components made of brittle materials, particularly indium phosphide or gallium arsenide, are not damaged when they are placed on the mold punch. The production method of the present invention is particularly suitable for bonding photodetectors to integrated optical lightwave guides since particularly precise positioning is necessary in this operation and because the method according to the present invention achieves precise positioning in a simple manner.

The cover according to the present invention can be produced particularly easily according to the methods of the present invention and is particularly suitable for use in an integrated optical circuit in which the lightwave guide is advantageously formed by the adhesive which fills a groove in the substrate, when the cover is bonded to a substrate. By providing at least two V-shaped grooves and an additional groove located between the V-shaped grooves in the substrate of the integrated optical circuit, by attaching the cover with the optical component to the substrate by means of an optically transparent adhesive, by simultaneously filling the additional groove with the adhesive, by arranging guide grooves of the cover above the grooves of the substrate, by arranging the light guides between the guide grooves and additional grooves, and by laterally positioning the cover relative to the substrate, the method of the present invention bonds the substrate and cover and couples the wave guides in one step. Thus, production can be carried out in cost-effective manner.

BRIEF DESCRIPTION OF THE DRAWING

Embodiments of the present invention are shown in the drawing and explained in greater detail in the following description.

FIG. 1 is a perspective view which illustrates an optical component used in the method of the present invention.

FIG. 2 is a perspective view which illustrates a mold punch used in the method of the present invention.

DETAILED DESCRIPTION

Figure 3:
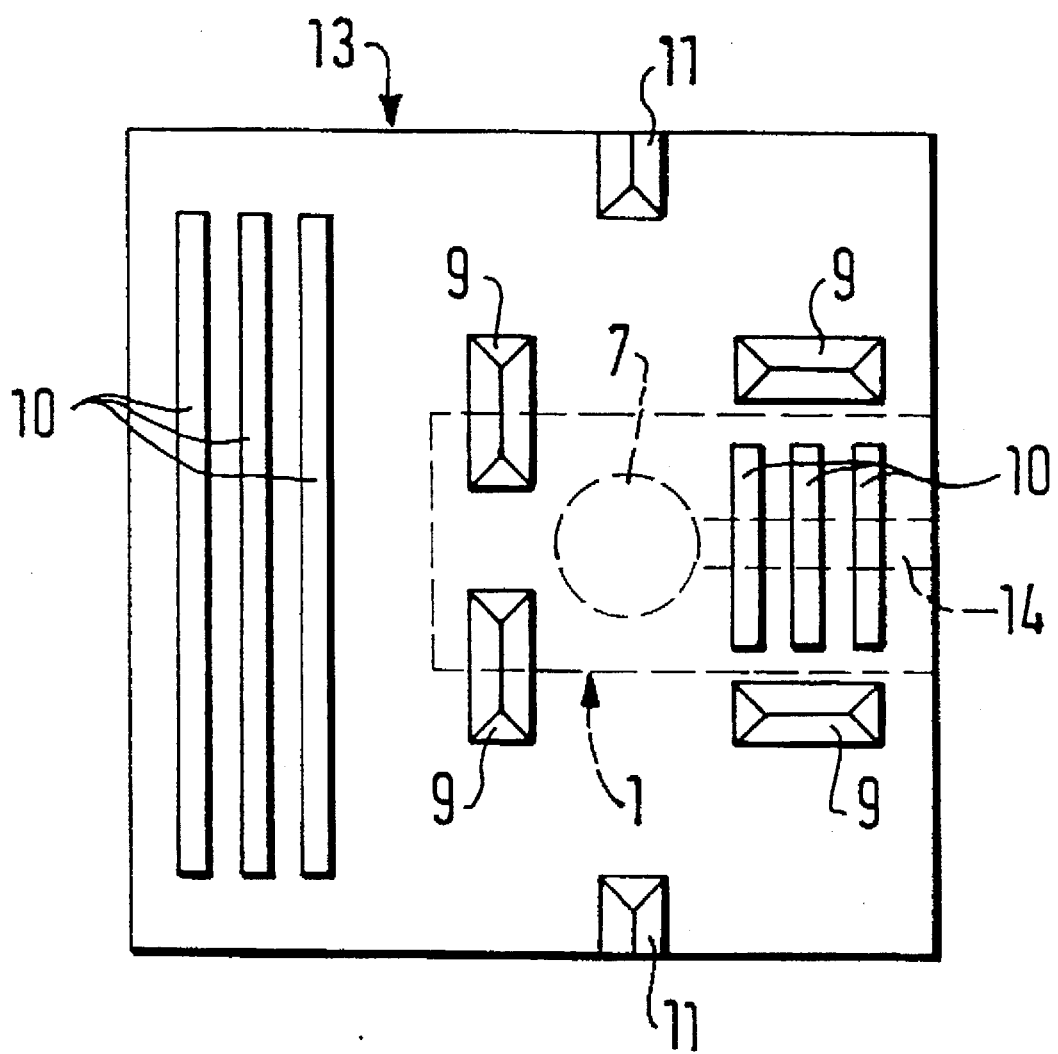
FIG. 3 is a plan view of a cover produced by the method of the present invention.

FIG. 1 is a perspective illustration of the optical component 1, which in this example is an indium phosphide photodetector. Two grooves 3 are made in the photodetector 1. The grooves 3 are arranged to align with each other and run parallel to a detector zone 7. From the detector zone 7, electrical incoming lines 14 pass to an outside edge of the optical component 1. In this example, the grooves 3 are formed as V-shaped grooves. Each of the grooves 3 extend from outside edges of the positioning component 1 to part way into the optical component 1.

In a particularly simple embodiment, the optical component 1 has only one recess 3, which is preferably formed as a groove. The location and the shape of the recess 3 must be selected based on the function of the recess and the structure of the optical component.

FIG. 2 is a perspective illustration of a mold punch 2, which has guide projections 4, projections 12, positioning devices 6 and stress relief ridges 5. The guide projections 4 extend from outside edges of the mold punch 2 and lead partially into the surface of the mold punch 2. Each of the guide projections 4 are preferably arranged at a right angle to outside edges of the mold punch 2. The length of the guide projections 4 is determined based on the fact that the guide grooves 11 (see FIG. 3), which are preferably V-shaped and which are molded by the guide projections 4, are used to hold lightwave guides. Furthermore, the guide projections 4 are aligned with each other. In this application example, the stress relief projections 5 are parallel to the alignment of the guide projections 4 and are arranged over the surface (for example, the entire surface) of the mold punch 2, except for the region between the guide projections 4. The stress relief projections 5 are preferably V shaped in this example. The size ratios of the stress relief projections 5 and the guide projections 4 are not shown true to scale, since the height of the guide projections 4 is on the order of 80 micrometers and the height of the stress relief projections 5 is in the range around 5 micrometers. The height and the width of the grooves 3 of the optical component 1 and the projections 12 of the mold punch 2 are shaped so that they are adapted to each other and allow precise positioning of the optical component 1 relative to the alignment of the guide projections 4, i.e., so that the optical component 1 is positioned precisely relative to the mold punch 2, both laterally and vertically.

Furthermore, the two aligned projections 12 are arranged parallel to the aligned guide projections 4 and are located in a region between the guide projections 4. The mold punch 2 also has two positioning devices 6. The positioning devices 6 are arranged parallel to one another, in a direction perpendicular to the alignment of the guide projections 4, and are laterally offset from the guide projections. Between the positioning devices 6, additional stress relief projections 5 are affixed parallel, for example, to the alignment of the guide projections 4. The projections 12 are of the same order of magnitude as the guide projections 4, i.e., approximately 80 micrometers high. The projections 12 and the positioning devices 6 are V shaped in this example. The mold punch 2 preferably consists of a metal (e.g., nickel) which has been galvanically cast from a silicon mold.

In a simple version of the present invention, the mold punch 2 has only one projection 12, in addition to at least one guide projection 4. Correspondingly, the optical component 1 also has only one groove 3. The location of the projection 12 on the mold punch 2 is adapted based on the location of the groove 3 of the optical component 1. If several projections 12 are arranged on the mold punch 2, then their location can be selected to correspond to the location of corresponding grooves 3 on the optical component 1.

In another, expanded embodiment of the present invention, the mold punch 2 also has at least one positioning device 6 in addition to at least one guide projection 4 and at least one projection 12. The location and the shape of the positioning device 6 must be selected in accordance with the function of the positioning device 6 and the shape (e.g., peripheral edge shape) of the optical component 1. The geometrical shape of the optical component 1 determines the shape of the positioning device 6.

FIG. 3 is a plan view which illustrates a cover 13 produced with the mold punch 2 shown in FIG. 2. The cover 13 has recesses 9. The recesses 9, which are offset laterally from, and parallel to, the alignment of the guide grooves 11 and are arranged between the guide grooves 11, were molded by the projections 12 of the mold punch 2.

The recesses 9, which are arranged perpendicular to the alignment of the guide grooves 11 and parallel to one another over the border region of the optical component 1, were molded by the positioning devices 6 of the mold punch 2. The location and orientation of the shaped optical component 1 is outlined with dashes in FIG. 3. The guide grooves 11, the recesses 9 and the depressions 10 are stamped in polymer in this example.

The production of the cover 13 for an integrated optical circuit is explained using FIGS. 1 to 3.

A cover 13 for an integrated optical circuit with an optical component 1, which is automatically positioned on guide grooves 11 for lightwave guides in the production of the cover, is produced using a mold punch 2, as shown in FIG. 2. The dimensions of the optical component 1, as shown in FIG. 1, are smaller than the distances between the guide projections 4 of the mold punch 2. To permit the optical component 1 to be laterally and vertically positioned with respect to the mold punch 2 in spite of this difference in dimensions, positioning devices 6 and projections 12 are formed on the mold punch 2.

The projections 12 are aligned with one another and are arranged laterally offset to the alignment of the guide projections 4. The optical component 1 shown in FIG. 1 has aligned grooves 3. The positioning devices 6 have beveled side surfaces at the sides which face the optical component 1 when the optical component 1 is laid down on it (i.e., the inward facing side surfaces). In this example, the positioning devices 6 are structured as V-shaped projections. Between the positioning devices 6, stress relief projections 5 (e.g., 3 stress relief projections) are arranged on the mold punch 2, parallel to the alignment of the guide projections 4. The mold punch 2 has additional stress relief projections 5, arranged parallel to the alignment of the guide projections 4, in the region of the mold punch 2 covered when the optical component 1 is placed onto the mold punch 2. No positioning devices 6 or stress relief projections 5 are arranged in the area defined by the alignment between the guide projections 4.

When the optical component 1 is placed onto the mold punch 2, the projections 12 of the mold punch 2 engage in the grooves 3 of the optical engagement component 1. This engagement determines the lateral position of the optical component 1 relative to the alignment of the guide projections 4. At the same time, the vertical position of the optical component 1 relative to the mold punch 2 is determined by the difference between the height of the projections 12 and the depth of the grooves 3. Furthermore, the optical component 1 is held along its lateral outside edges 8 by the positioning devices 6. Thus, when the optical element 1 is placed down onto the mold punch 2, rotation or tilting of the optical component 1 relative to the mold punch 2 down is prevented. Since the optical component 1 is placed down onto the mold punch 2 under pressure, and since many of the materials used for producing optical components, such as indium phosphide, are very brittle, bending and damage of the optical component 1 must be prevented. By resting the optical component 1 on the stress relief projections 5 of the mold punch 2 with a large part of its entire surface, such bending and damage is prevented.

The optical component 1 now lies on the projections 12 with the grooves 3 and on the stress relief projections 5. To better insert the optical component 1 between the positioning devices 6, the lateral outside edges 8 of the optical component 1 are at least partially beveled. This allows the lateral outside edges 8 and the beveled side surfaces of the positioning devices 6 to slide against each other when they come into contact. This reduces the pressure required for positioning the optical component 1 relative to the mold punch 2 and increases the tolerances for the optical component 1 with regard to the distance of the positioning devices 6.

With this method, the contact wires 14, which lead from the outside edge to the active zone 7 of the optical component 1, as shown in FIG. 1, are not completely covered by a polymer. As a result, the electrical incoming lines 14 can be contacted without having to remove the polymer, i.e., the polymer can be removed at the edge without problems to produce the contact.

To produce the cover 13, the component 1 is placed onto the mold punch 2. To ensure that the polymer flows into all the regions between the component 1 and the mold punch 2, the component 1 is wetted with liquid polymer before it is placed on the mold punch 2. Subsequently, a liquid which can harden, in this example a liquid polymer, is poured around the positioned optical component 1 and the mold punch 2. After the curing time of the liquid polymer, the mold punch 2 is removed and a cover 13, as shown in FIG. 3, is obtained.

The cover 13 now has depressions 10 (molded by the stress relief projections 5), recesses 9 (formed by the projections 12 and the positioning devices 6), and guide grooves 11 (formed by the guide projections 4). The active zone 7 of the optical component 1, as shown in FIG. 3, is positioned relative to the alignment of the guide grooves 11.

To produce an integrated optical circuit, a substrate (not shown) that has at least two, preferably V-shaped grooves is used. The distance, the size and the orientation of the V-shaped grooves correspond to that of the guide grooves 11 of the cover 13. An additional groove is arranged between the two V-shaped grooves. The integrated optical circuit is covered with a transparent adhesive where the additional groove lying between the V-shaped grooves is filled and thus forms a lightwave guide. A light guide, and in particular light fibers, is inserted in each of the two V-shaped grooves. The V-shaped grooves in which the light guides are inserted are also covered with the transparent adhesive. The cover 13 is placed onto the integrated optical circuit such that the light guides are also held by the guide grooves 11. The cover 13 is pressed down with sufficient force such that only a thin layer of transparent adhesive remains between the integrated optical circuit and the cover 13. When this is done, the recesses 9 and depressions 10 are also filled with the transparent adhesive. In this manner, an integrated optical circuit is produced, in which an optical component 1 located in a cover 13 is automatically positioned on the lightwave guide filled with adhesive and lying between the V-shaped grooves when the cover 13 is glued on, and in which the lightwave guide is formed by filling the additional groove with adhesive.

The production method described can also be applied analogously to mold punches 2 which have only at least one guide projection 4 and at least one projection 12 or at least one guide projection 4 and at least one projection 12 and one positioning device 6.

To simply position the optical element 1, it is sufficient if the optical component 1 is positioned by at least one projection 12.

More precise positioning of the optical component 1 is achieved if the mold punch 2 has at least one positioning device 6 in addition to the projection 12, which positions the optical component at an outside edge.

I claim

1. An assembly for an integrated optical circuit comprising:
    a) an optical component having at least one groove extending to an outside edge of the optical component;
    b) a cover having at least one recess extending the groove of the optical component away from the outside edge of the optical component and a guide groove to hold light guides; and
    c) an integrated optical circuit comprising a substrate that has at least two first grooves and an additional groove located between the at least two first grooves,
    wherein the cover of the optical component is attached to the substrate by an optically transparent adhesive, wherein the optically transparent adhesive also fills the additional groove lying between the at least two first grooves, and
    wherein the cover and the substrate are positioned laterally with respect to one another so that the guide grooves of the cover are arranged above the at least two first grooves of the substrate to form guide channels in which the light guides extending in the direction of the additional groove are received.

2. The assembly according to claim 1, wherein the cover has at least one additional recess adjacent to the outside edge of the optical component, the additional recess corresponding to a shape of a positioning device of a punch mold.

3. The assembly according to claim 1 wherein the cover has depressions corresponding to stress relief projections of a punch mold.

4. The assembly according to claim 1 wherein the optical component is a photodetector.

* * * * *